(12) United States Patent
Lee et al.

(10) Patent No.: US 8,982,444 B2
(45) Date of Patent: Mar. 17, 2015

(54) ELECTROWETTING DISPLAY DEVICE AND MANUFACTURING METHOD THEREOF

(71) Applicant: Liquavista B.V., Eindhoven (NL)

(72) Inventors: Bo Ram Lee, Gyeonggi-Do (KR); Taimei Kodaira, Gyeonggi-Do (KR); Dae Jin Park, Incheon (KR); Joo-Han Bae, Gyeonggi-Do (KR); Seung-Jin Baek, Gyeonggi-Do (KR); Da Hye Yoon, Gyeonggi-Do (KR); Hyeon Gu Cho, Gyeonggi-Do (KR)

(73) Assignee: Amazon Technologies, Inc., Reno, NV (US)

( * ) Notice: Subject to any disclaimer, the term of this patent is extended or adjusted under 35 U.S.C. 154(b) by 60 days.

(21) Appl. No.: 13/748,700

(22) Filed: Jan. 24, 2013

(65) Prior Publication Data

US 2013/0208337 A1    Aug. 15, 2013

(30) Foreign Application Priority Data

Feb. 9, 2012  (KR) .................. 10-2012-0013290
Aug. 8, 2012  (KR) .................. 10-2012-0086949

(51) Int. Cl.
*G02B 26/00*    (2006.01)
*G02F 1/03*    (2006.01)
*G02F 1/133*    (2006.01)

(52) U.S. Cl.
CPC .................................. *G02B 26/005* (2013.01)
USPC .............. 359/290; 359/245; 359/665; 349/33

(58) Field of Classification Search
USPC ......... 359/290–293, 295, 315–316, 276, 238, 359/245, 242, 259, 244, 253–254, 265–275, 359/665–667, 223–225, 243, 260–263; 349/33; 252/586
See application file for complete search history.

(56) References Cited

U.S. PATENT DOCUMENTS

| | | | |
|---|---|---|---|
| 6,338,901 B1 * | 1/2002 | Veerasamy | 428/408 |
| 7,746,540 B2 | 6/2010 | Lo et al. | |
| 7,821,699 B1 | 10/2010 | Lo et al. | |
| 8,040,583 B2 * | 10/2011 | Takahashi | 359/228 |
| 2006/0285067 A1 | 12/2006 | Kim | |
| 2008/0067506 A1 * | 3/2008 | Takei et al. | 257/40 |
| 2009/0103159 A1 | 4/2009 | Cheng et al. | |
| 2010/0231647 A1 | 9/2010 | Uchiyama | |
| 2010/0238236 A1 | 9/2010 | Uchiyama | |
| 2011/0014389 A1 | 1/2011 | Ito | |
| 2012/0019523 A1 | 1/2012 | Lee et al. | |
| 2013/0222880 A1 * | 8/2013 | Nakasuga et al. | 359/290 |
| 2013/0242372 A1 * | 9/2013 | Park et al. | 359/290 |

FOREIGN PATENT DOCUMENTS

| | | |
|---|---|---|
| JP | 4466763 B2 | 3/2010 |
| KR | 1020070081736 A | 8/2007 |
| KR | 1020110045538 A | 5/2011 |
| KR | 1020110112946 A | 10/2011 |
| KR | 1020120021075 A | 3/2012 |

* cited by examiner

*Primary Examiner* — Dawayne A Pinkney
(74) *Attorney, Agent, or Firm* — Lee & Hayes, PLLC

(57) ABSTRACT

The present inventive concept relates to an electrowetting display device including a lyophobic colloid material and a polymer resin such as an organic layer or a polyimide (PI), and a lyophobic layer including a supporting layer supporting the lyophobic colloid material and using a photoreactive fluorine-based surfactant for a fluorine-based material to be positioned above and for a hardened photoreactive material layer to be positioned below through exposure in a single step without separately performing a hydrophilic treatment and then a water-repellent treatment, thereby reducing the number of processes, the manufacturing time, and the cost.

29 Claims, 23 Drawing Sheets

FIG. 8

| No. | Layer and a thickness | | wt% | Cell내 Sample position | Depth Profile | |
|---|---|---|---|---|---|---|
| 1 | Organic layer SOHN-412R8 (400~500nm) | Lyophobic (24nm~30nm) | 6 | Center | | Organic layer SOHN-412R8 and Lyophobic 6wt% are mixed |
| 2 | Organic layer SOHN-412R8 (400~500nm) | Lyophobic (32nm~40nm) | 8 | Center | stopping when detecting SiOx | Organic layer SOHN-412R8 and Lyophobic 8wt% are mixed |
| 3 | PI(AL22636) (1000Å~1500Å) | Lyophobic (60Å~90Å) | 6 | Center | | PI(AL22636) Lyophobic 6wt% are mixed |

FIG. 14

| Sample Name | Polymer composition | | | | |
|---|---|---|---|---|---|
| | Content of new fluoroacrylate [Rf(C4)a-X] (wt%) | alkali-soluble monomer | cross-linkage A monomer | cross-linkage B monomer | cross-linkage C monomer |
| aFA60 | 60 | O | | | |
| aFA60-A | 60 | O | O | | |
| aFA60-B | 60 | O | | | O |
| aFA60-C | 60 | O | O | O | |
| aFA60-D3 | 60 | O | O | O | O |
| aFA45-F | 45 | O | O | O | |
| aFA60-C-F40P | 40 | O | O | O | |
| aFA60-C-F45P | 45 | O | O | O | |
| aFA60-C-F50P | 50 | O | O | O | |
| aFA60-C-F55P | 55 | O | O | O | |
| aFA60-C-F65P | 65 | O | O | O | |
| aFA60-C-F70P | 70 | O | O | O | |
| aFA60-C-F75P | 75 | O | O | O | |
| aFA60-C-F80P | 80 | O | O | O | |
| aFA65-J | 65 | O | O | O | |
| aFA70-D5-A | 70 | O | O | O | |
| aFA70-D5 | 70 | O | O | O | O |
| aFA45-F-F50P | 50 | O | O | O | |
| aFA45-F-F55P | 55 | O | O | O | |
| aFA50-G | 50 | O | O | O | |
| aFA55-H | 55 | O | O | O | |
| aFA55-I | 55 | | O | O | |
| aFA45-F-n3 | 45 [Rf(C6)a-X] | O | O | O | |
| aFA55-I-n2 | 55 [PFPE(C8)a-CH3] | | O | O | |

FIG. 15

| Sample Name | Molecular weight (Mw) | Contact angle(°) | | |
|---|---|---|---|---|
| | | water | n-HD | BCA |
| aFA60 | 6,015 | 105 | 57 | 59 |
| aFA60-A | 7,604 | 103 | 60 | 57 |
| aFA60-B | 6,587 | 104 | 59 | 56 |
| aFA60-C | 6,827 | 104 | 64 | 57 |
| aFA60-D3 | 7,606 | 104 | 65 | 78 |
| aFA45-F | 8,215 | 102 | 61 | 58 |
| aFA60-C-F4OP | 6,351 | 102 | 60 | 57 |
| aFA60-C-F45P | 6,356 | 102 | 61 | 58 |
| aFA60-C-F5OP | 6,395 | 102 | 62 | 58 |
| aFA60-C-F55P | 6,777 | 103 | 63 | 58 |
| aFA60-C-F65P | 7,154 | 105 | 64 | 59 |
| aFA60-C-F7OP | 7,314 | 105 | 65 | 61 |
| aFA60-C-F75P | 7,189 | 106 | 65 | 62 |
| aFA60-C-F8OP | 6,638 | 107 | 65 | 63 |
| aFA65-J | 6,486 | 104 | 65 | 59 |
| aFA70-D5-A | 8,088 | 107 | 65 | 61 |
| aFA70-D5 | 8,188 | 107 | 66 | 60 |
| aFA45-F-F50P | 6,605 | 103 | 62 | |
| aFA45-F-F55P | 6,507 | 104 | 63 | |
| aFA50-G | 7,341 | 104 | 63 | |
| aFA55-H | 6,807 | 105 | 64 | |
| aFA55-I | 6,548 | 107 | 64 | 59 |
| aFA45-F-n3 | 5,480 | 107 | 65 | 67 |
| aFA55-I-n2 | 6,416 | 106 | 63 | 64 |

# ELECTROWETTING DISPLAY DEVICE AND MANUFACTURING METHOD THEREOF

CROSS-REFERENCE TO RELATED APPLICATIONS

This application claims priority to and the benefit of Korean Patent Application No. 10-2012-0013290 filed in the Korean Intellectual Property Office on Feb. 9, 2012 and Korean Patent Application No. 10-2012-0086949 filed in the Korean Intellectual Property Office on Aug. 8, 2012, the entire contents of both of which are incorporated by reference herein.

TECHNICAL FIELD

The present invention relaters to an electrowetting display device and a manufacturing method thereof.

DISCUSSION OF THE RELATED ART

Currently popular flat panel displays include liquid crystal displays (LCDs), plasma display devices (PDPs), organic light emitting displays (OLEDs), field effect displays (FEDs),s electrophoretic displays (EPDs), and electrowetting display devices (EWDs).

Electrowetting display devices produce a gray color in pixels by controlling the movement of an oil in water as an electrolyte. The electrowetting display device is a display device of a shutter type that does not use a polarizer such that transmittance is good and a gamma characteristic according to a voltage is represented as linear. The electrowetting display device may be of a reflective type or a transmissive type and may be manufactured with a shape that is suitable to an environment in which the display device is used. A backlight may be used in the transmissive type of electrowetting display device, but is not appropriate for use in a reflective type of electrowetting display device.

SUMMARY

The present inventive concept provides an electrowetting display device without the requirement of performing a hydrophilic treatment or a hydrophobic treatment. Also provided is a method of manufacturing an electrowetting display device.

An electrowetting display device according to an exemplary embodiment of the present inventive concept includes: a substrate; a pixel electrode formed on the substrate; an interlayer insulating layer formed on the pixel electrode; a plurality of partitions formed on the interlayer insulating layer; and a lyophobic layer formed on the interlayer insulating layer between the partitions, wherein the lyophobic layer is phase-separated.

A manufacturing method of an electrowetting display device according to an exemplary embodiment of the present inventive concept includes: forming a pixel electrode on a substrate; forming an interlayer insulating layer on the pixel electrode; forming a partition on the interlayer insulating layer; coating a lyophobic colloid mixed liquid on the interlayer insulating layer between the partitions; and pre-baking the lyophobic colloid mixed liquid, wherein the lyophobic colloid mixed liquid comprises a mixture including a lyophobic colloid material and a supporting layer material, wherein the supporting layer material comprises a polymer resin of an organic layer or a polyimide (PI).

Also provided is an electrowetting display device that includes a substrate; a pixel electrode formed on the substrate; a plurality of partitions formed on the pixel electrode; a phase-separated photoreactive fluorine-based surfactant layer formed on an interlayer insulating layer between the partitions; and a water-repellent layer formed on the photoreactive fluorine-based surfactant layer.

The present inventive concept further provides a method for manufacturing an electrowetting display device, including: forming a pixel electrode on a substrate; coating a photoreactive fluorine-based surfactant on the pixel electrode; exposing the coated photoreactive fluorine-based surfactant to be hardened to remove the photoreactive fluorine-based surfactant that is not exposed and to form a photoreactive fluorine-based surfactant layer; forming a plurality of partitions at a region where the photoreactive fluorine-based surfactant is removed; and forming a water-repellent layer on the hardened photoreactive fluorine-based surfactant layer.

BRIEF DESCRIPTION OF THE DRAWINGS

FIG. 8 to FIG. 11 are a table and graphs showing a characteristic of a lyophobic colloid mixture solution and a pre-baked layer according to an exemplary embodiment of the present inventive concept.

FIG. 14 and FIG. 15 show kinds and characteristics of lyophobic colloids according to an exemplary embodiment of the present invention.

DETAILED DESCRIPTION OF THE EMBODIMENTS

Figure 1:
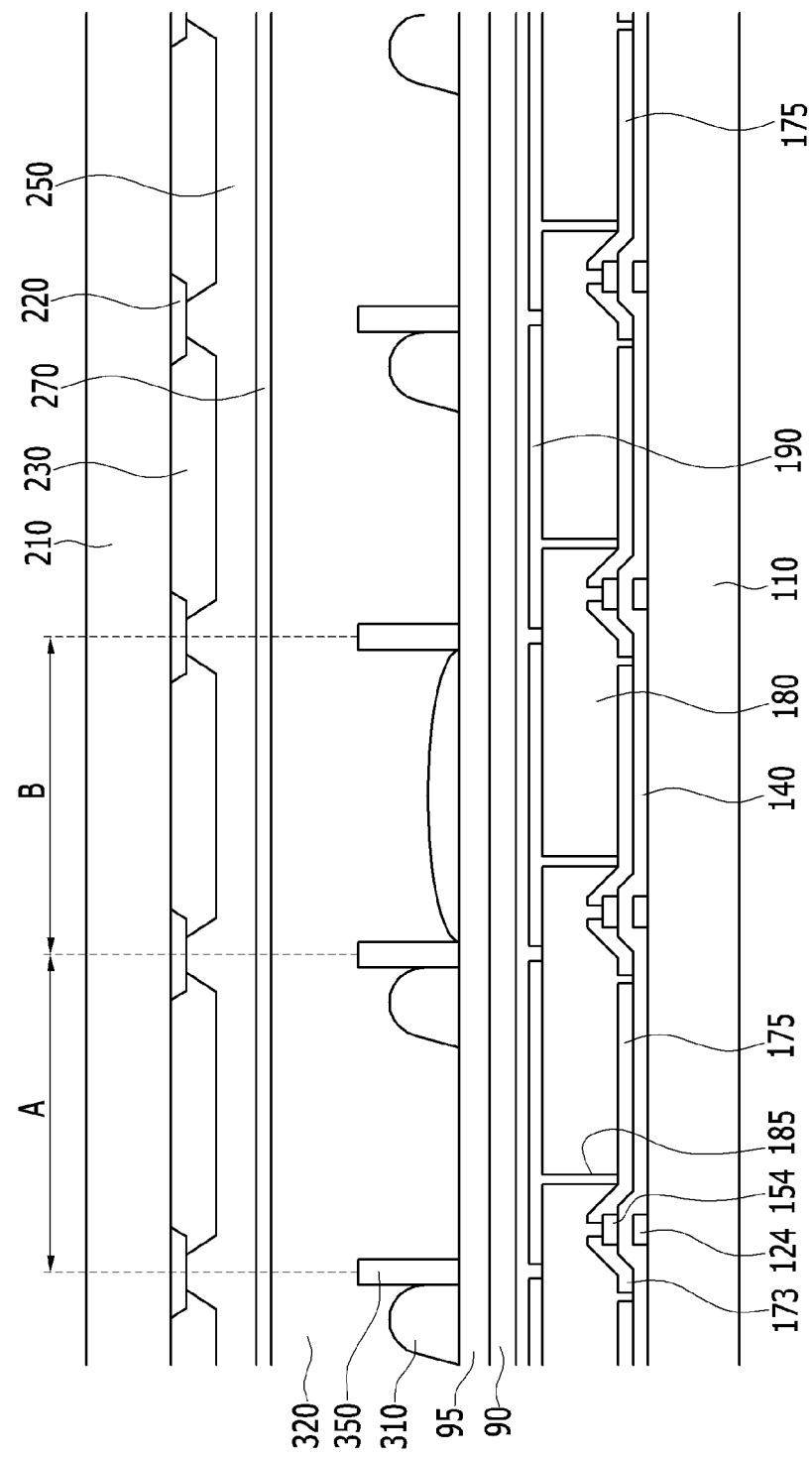
FIG. 1 is a cross-sectional view of an electrowetting display device according to an exemplary embodiment of the present inventive concept.

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

The electrowetting display device uses a process for forming a thin film transitor (TFT) like other flat panel displays, such as for instance a liquid crystal display, however a filling process for filling the water and the oil is required. For normal operation of the electrowetting display device, a layer positioned under the oil is hydrophobic, i.e. is water-repellent, however it is difficult to form a hydrophilic layer which is partitioned from the water-repellent layer. To form this partitioned hydrophilic layer, a reactive ion etching (RIE) treatment may be performed on the water-repellent layer. After the partition is formed, the oil is filled and the water-repellent layer may be thermally-reflowed to have a suitable hydrophobicity for the operation of the electrowetting display device.

As described above, to provide separated hydrophilic and the hydrophobic layers, a plurality of processes are required making the manufacturing process complicated and increasing the manufacturing time, and consequently the cost of production is increased. Also, after the reflow process the water-repellent layer may not have sufficient hydrophobicity such that an oil filling defect may be formed and abnormal operation of the electrowetting display device may occur.

In an embodiment of the inventive concept the electrowetting display device includes: a substrate; a pixel electrode formed on the substrate; an interlayer insulating layer formed on the pixel electrode; a plurality of partitions formed on the interlayer insulating layer; and a lyophobic layer formed on the interlayer insulating layer between the partitions. wherein the lyophobic layer is phase-separated.

In an embodiment of the inventive concept the lyophobic layer may include a lyophobic colloid material and a supporting layer, the lyophobic colloid material may be positioned above the supporting layer.

In an embodiment of the inventive concept the lyophobic colloid material may include an Rf group; the Rf group can be for instance, Rf C4α-X.

In an embodiment of the inventive concept the lyophobic colloid material may be a liquid repellent agent of Daikin.

In an embodiment of the inventive concept the supporting layer may include an organic layer or a polyimide resin.

In an embodiment of the inventive concept a black oil layer may be disposed on the lyophobic layer between the partitions.

In an embodiment of the inventive concept a reflecting electrode formed of a material that reflects light may be disposed between the pixel electrode and the interlayer insulating layer.

In an embodiment of the inventive concept the manufacturing method of an electrowetting display device includes: forming a pixel electrode on a substrate; forming an interlayer insulating layer on the pixel electrode; forming a partition on the interlayer insulating layer; coating a lyophobic colloid mixed liquid on the interlayer insulating layer between the partitions; and pre-baking the lyophobic colloid mixed liquid, wherein the lyophobic colloid mixed liquid comprises a mixture including a lyophobic colloid material and a supporting layer material, wherein the supporting layer material comprises a polymer resin of an organic layer or a polyimide (PI).

In an embodiment of the method of the inventive concept the lyophobic colloid mixed liquid may be phase-separated by the pre-baking of the lyophobic colloid mixed liquid and may form a lyophobic layer, and the lyophobic layer may include a lyophobic colloid material and a supporting layer.

In an embodiment of the method of the inventive concept the lyophobic colloid material may be positioned above the supporting layer.

In an embodiment of the method of the inventive concept the lyophobic colloid material may include an Rf group. In an embodiment of the inventive concept the Rf group may be Rf C4α-X.

In an embodiment of the method of the inventive concept the lyophobic colloid material may be a liquid repellent agent of Daikin.

In an embodiment of the method of the inventive concept the supporting layer may include an organic layer of a polymer resin or a polyimide.

In an embodiment of the method of the inventive concept the lyophobic colloid mixed liquid may be coated through a spin coating method, a spray coating method, an inkjet injecting method, or a polyimide (PI) print method.

In an embodiment of the inventive concept after the pre-baking, the method may further include forming a black oil layer on the lyophobic layer between the partitions.

In an embodiment of the inventive concept the method may further include forming a reflecting electrode of a material that reflects light between the pixel electrode and the interlayer insulating layer.

As described above, the electrowetting display device according to an exemplary embodiment of the inventive concept may be formed without the necessity of performing a hydrophilic treatment and a water-repellent treatment. Therefore, the number of processes may be reduced, decreasing the manufacturing time and consequently reducing the cost.

Furthermore, the hydrophilic treatment and the water-repellent treatment are not each performed as a separate layer and consequently, the hydrophobic characteristic is maintained and not deteriorated; defects produced during oil filling are avoided, and an operation of the electrowetting display device is more easily completed.

In an embodiment of the inventive concept an electrowetting display device is provided, wherein the photoreactive fluorine-based surfactant includes a photoreactive material layer that is hardened by light and a fluorine-based material, and the fluorine-based material is positioned above the hardened photoreactive material layer.

In an embodiment of the inventive concept an electrowetting display device is provided, wherein the photoreactive fluorine-based surfactant is "Megaface RS-72-K" manufactured by DIC company.

In an embodiment of the inventive concept an electrowetting display device is provided, wherein the photoreactive fluorine-based surfactant includes a compound having a perfluoro alkyl group and a photoreactive material.

In an embodiment of the inventive concept an electrowetting display device is provided, wherein a black oil layer is formed on the lyophobic layer between the partitions.

In an embodiment of the inventive concept an electrowetting display device is provided, wherein the interlayer insulating layer is formed on the pixel electrode and under the photoreactive fluorine-based surfactant layer and the partition.

In an embodiment of the inventive concept a method for manufacturing an electrowetting display device is provided, wherein the method includes: forming a pixel electrode on a substrate; coating a photoreactive fluorine-based surfactant on the pixel electrode; exposing the coated photoreactive fluorine-based surfactant to be hardened to remove the photoreactive fluorine-based surfactant that is not exposed and to form a photoreactive fluorine-based surfactant layer; forming a partition at a region where the photoreactive fluorine-based surfactant is removed; and forming a water-repellent layer on the hardened photoreactive fluorine-based surfactant layer.

In an embodiment of the inventive concept a method for manufacturing an electrowetting display device is provided, wherein the photoreactive fluorine-based surfactant includes a photoreactive material layer that is hardened by light and a fluorine-based material.

In an embodiment of the inventive concept a method for manufacturing an electrowetting display device is provided, wherein during the exposure of the coated photoreactive fluorine-based surfactant, the coated photoreactive fluorine-based surfactant is phase-separated such that the fluorine-based material is positioned above the hardened photoreactive material layer.

In an embodiment of the inventive concept a method for manufacturing an electrowetting display device is provided, wherein the photoreactive fluorine-based surfactant is "Megaface RS-72-K" manufactured by DIC company.

In an embodiment of the inventive concept a method for manufacturing an electrowetting display device is provided, wherein the photoreactive fluorine-based surfactant includes a compound having a perfluoro alkyl group and a photoreactive material.

In an embodiment of the inventive concept a method for manufacturing an electrowetting display device is provided, wherein a developer is provided to remove the photoreactive fluorine-based surfactant that is not exposed.

In an embodiment of the inventive concept a method for manufacturing an electrowetting display device is provided, wherein a developer is provided to remove the photoreactive fluorine-based surfactant that is not exposed, the method further includes after forming the water-repellent layer, forming a black oil layer on the lyophobic layer between the partitions.

In an embodiment of the inventive concept a method for manufacturing an electrowetting display device is provided, wherein a developer is provided to remove the photoreactive fluorine-based surfactant that is not exposed, the method further comprising forming an interlayer insulating layer on the pixel electrode between the forming of the pixel electrode and the coating of the photoreactive fluorine-based surfactant.

An electrowetting display device according to an exemplary embodiment of the present inventive concept will now be described with reference to accompanying drawings.

Firstly, a display device according to an exemplary embodiment of the present inventive concept will be described with reference to FIG. 1.

FIG. 1 is a cross-sectional view of an electrowetting display device according to an exemplary embodiment of the inventive concept.

As shown in FIG. 1, an electrowetting display device according to an exemplary embodiment of the inventive concept as a transmissive electrowetting display device includes a lower substrate 110 formed with a pixel electrode 190, an upper substrate 210 facing the lower substrate 110 and formed with a common electrode 270, and electro-optic layers 310 and 320 positioned between the lower substrate 110 and the upper substrate 210. The lower substrate 110 includes partitions 350 forming a plurality of openings (a space between partitions), and the electro-optic layers 310 and 320 include a black oil layer 310 and the partition 350 disposed inside the opening of the partition 350 and an aqueous solution layer 320 positioned between the black oil layer 310 and the common electrode 270.

The lower substrate 110 and the upper substrate 210 may be flexible substrates made of glass, plastic, or a glass fiber reinforced plastic (FRP).

Gate electrodes 124 connected to a plurality of gate lines extending in one direction are formed on the lower substrate 110. A gate insulating layer 140 is made of silicon nitride (SiNx) is formed over lower substrate 110 and the gate lines and the gate electrodes 124.

A semiconductor layer 154 made of hydrogenated amorphous silicon is formed on the gate insulating layer 140. The semiconductor layer 154 forms a channel of the thin film transistor. A data line and a drain electrode 175 are formed on the gate insulating layer 140 and the semiconductor layer 154. The data line extends in a direction perpendicular to the gate line, intersecting the gate line, and a branch extended from the data line forms a source electrode 173. At least portions of a pair of a source electrode 173 and a drain electrode 175 are positioned on the semiconductor layer 154, and they are separated from each other and are opposite to each other on either side of the gate electrode 124.

An ohmic contact is positioned between the semiconductor layer 154, and the source electrode 173 and the drain electrode 175, reducing contact resistance therebetween.

A passivation layer 180 made of an insulating material such as silicon oxide or silicon nitride or an organic material is formed on the source electrode 173, the drain electrode 175, the semiconductor layer 154, and the gate insulating layer 140.

A pixel electrode 190 made of a transparent conductive material such as ITO (indium tin oxide) or IZO (indium zinc oxide) is formed on the passivation layer 180.

The passivation layer 180 has a contact hole 185 exposing the drain electrode 175. The pixel electrode 190 is physically and electrically connected to the drain electrode 175 through the contact hole 185.

An interlayer insulating layer 90 is formed on the pixel electrode 190, and the interlayer insulating layer 90 is formed of an inorganic insulating layer such as silicon nitride (SiNx) or an organic insulator. The interlayer insulating layer 90 may have a function of leveling by removing any step that may have been generated between the neighboring pixel electrodes 190.

Partitions 350 are formed on the interlayer insulating layer 90. The partitions 350 are formed with a matrix shape having openings defining a pixel area, and may be made of an organic layer including a black dye.

A lyophobic layer 95 having a lyophobicity property and that is phase-separated is disposed on the interlayer insulating layer 90 between the openings of the partitions 350. The lyophobicity layer 95 is a layer originally formed from a mixture of a lyophobic colloid material and a polymer resin such as an organic layer or a polyimide (PI), that have been phase-separated such that the lyophobic colloid material is positioned above the polymer resin, which may be an organic layer such as a polyimide (PI).

Figure 2:
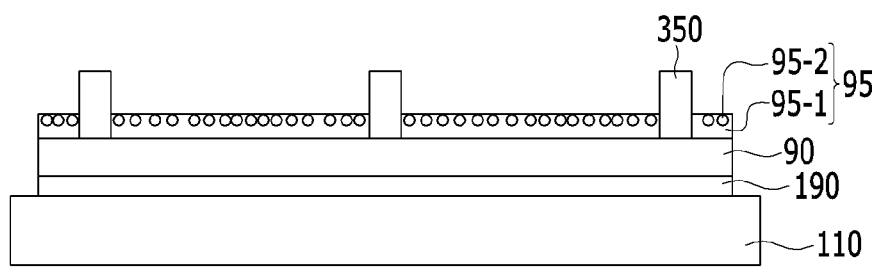
FIG. 2 is an enlarged cross-sectional view of an electrowetting display device according to an exemplary embodiment of the present inventive concept.

FIG. 2 is an enlarged cross-sectional view of an intermediate in the manufacture of an electrowetting display device according to an exemplary embodiment of the present inventive concept, wherein the focus is on layers formed on the lower substrate 110.

To describe the lyophobic layer in detail, FIG. 2 shows an enlarged cross-sectional view of an electrowetting display device according to an exemplary embodiment of the inventive concept.

In FIG. 2, the thin film transistor (the gate electrode, the source electrode, the drain electrode, and the conductor layer) formed on the lower substrate 110 is omitted, and only a structure of the pixel electrode 190 is shown.

A pixel electrode 190 is formed on the lower substrate 110. In FIG. 2, the pixel electrode 190 is integrally formed, however, in reality the pixel electrode 190 is electrically separated for each pixel, even though FIG. 2 shows a schematic layer where the pixel electrode 190 is formed and a boundary for each pixel electrode is not shown.

An interlayer insulating layer 90 is formed on the pixel electrode 190 and partitions 350 are formed thereon. The interlayer insulating layer 90 is not lyophobic (or hydrophobic) such that there is no problem forming the partition 350 on the interlayer insulating layer 90.

A lyophobic layer 95 is formed on the interlayer insulating layer 90 in the openings between the partitions 350. The lyophobicity layer 95 is phase-separated as shown in FIG. 2. That is, the lyophobicity layer 95 includes a lyophobic colloid material 95-2 that separates from and forms a layer above a supporting layer 95-1 that includes a polymer resin, such as the organic layer which may be a polyimide (PI) below.

Next, a manufacturing method of an electrowetting display device according to an exemplary embodiment of the present inventive concept will be sequentially described with reference to FIG. 3 to FIG. 6.

FIG. 3 to FIG. 6 are cross-sectional views showing each manufacturing step of an electrowetting display device according to an exemplary embodiment of the present inventive concept.

FIG. 3 to FIG. 6 sequentially show each layer formed on the lower substrate 110 of the electrowetting display device according to the exemplary embodiment of FIG. 2.

Figure 3:
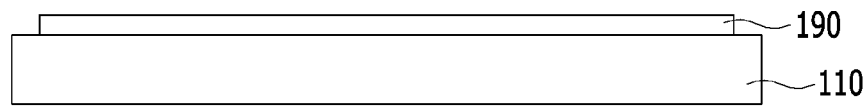
FIG. 3 to FIG. 6 are cross-sectional views showing each manufacturing step of an electrowetting display device according to an exemplary embodiment of the present inventive concept.

Firstly, a pixel electrode 190 is formed on the lower substrate 110 as shown in FIG. 3. In FIG. 3, the pixel electrode 190 is integrally shown to schematically show the formation position of the pixel electrode 190. However, just as explained above for FIG. 2, in actuality, the pixel electrode 190 is formed for each pixel and the pixel electrode 190 of each pixel is separated from the pixel electrode 190 of every other pixel.

Figure 4:
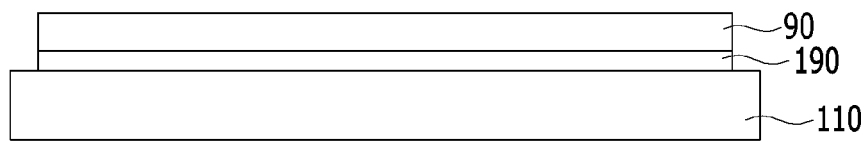

Next, as shown in FIG. 4, an interlayer insulating layer 90 is formed on the pixel electrode 190. The interlayer insulating layer 90 may be formed of an inorganic insulating layer such as silicon nitride (SiNx) or an alternative organic insulator, and may have the function of removing the step generated between the neighboring pixel electrodes 190. In addition, the interlayer insulating layer 90 may also have a function of providing a surface on which the partition 350 disposed thereon can be easily formed.

Figure 5:
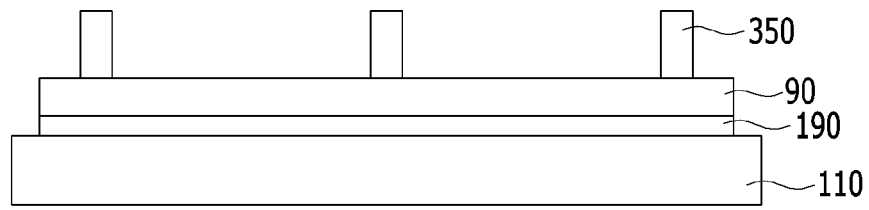

Next, as shown in FIG. 5, partitions 350 are formed on the interlayer insulating layer 90. The partitions 350 are formed in a matrix shape having openings for defining the pixel area such that a black oil layer 310 is confined by the partitions and only moves inside the pixel area. In an embodiment of the inventive concept, the partitions 350 may be formed of an organic layer including a black pigment.

A method of manufacturing the lyophobicity layer 95 will be described with reference to FIG. 6.

A black oil layer 310 is formed on the opening and the lyophobic layer 95.

Meanwhile, a black matrix 220 having openings is formed under the upper substrate 210, and a color filter 230 is formed in the opening of the black matrix 220. The color filter 230 includes a pigment only transmitting a predetermined wavelength or that may be made of a quantum dot (semiconductor nanocrystal) material. The quantum dot material as the semiconductor material having a crystalline structure with a size of several nanometers includes several hundred to several thousand atoms, and the size thereof is very small such that a surface for a unit volume is wide and a quantum confinement effect appears. Accordingly, unique physical and chemical characteristics that are different from the corresponding original characteristics of the semiconductor material appear.

For color display, each pixel PX uniquely represents one of primary colors (i.e., spatial division) or each pixel PX sequentially represents the primary colors in turn (i.e., temporal division), such that a spatial or temporal sum of the primary colors is recognized as a desired color. An example of a set of the primary colors includes red, green, and blue colors.

A planarizing layer 250 is formed under the color filter 230 and the black matrix 220, and a common electrode 270 is formed under the planarizing layer 250.

Meanwhile, an aqueous solution layer 320 is formed between the partition 350 and the black oil layer 310, and the common electrode 270. The aqueous solution layer 320 is not mixed with the black oil layer 310.

Surface tension of the aqueous solution layer 320 is not changed in the pixel B in which an electric field is not formed between the pixel electrode 190 and the common electrode 270 such that the black oil layer 310 covers the entire corresponding pixel B. Accordingly, the light incident from a lower side is not emitted in an upper side, and thereby black is displayed.

Meanwhile, the surface tension of the aqueous solution layer 320 is changed in the pixel A in which an electric field is formed between the pixel electrode 190 and the common electrode 270 such that the black oil layer 310 is accumulated together, thereby opening the corresponding pixel A. Accordingly, the light incident from the lower side is emitted in the upper side such that the pixel A displays a color according to the color filter 230.

According to an exemplary embodiment, the color filter 230 may be omitted, and when the flat panel display according to the present invention does not include the color filter 230, the pixel A displays white such that the flat panel display may be used as a black and white display device.

Figure 6:
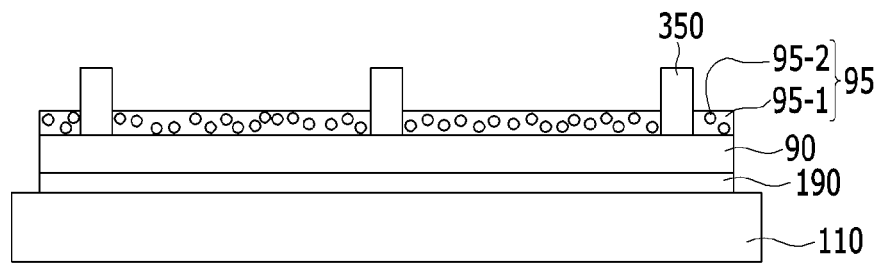

Next, as shown in FIG. 6, the lyophobic colloid material 95-2 and the supporting layer 95-1 material of a solvent type including the polymer resin such as the organic layer or the polyimide (PI) are mixed (hereinafter referred to as a mixed liquid or a lyophobic colloid mixed liquid) and are coated through a spin coating method, a spray coating method, an inkjet injecting method, or a polyimide (PI) print method. When using the spin coating method or the spray coating method, the mixed liquid is coated between the partitions 350 only due to the difference in surface energy of the partitions 350 and the surface between the partitions. Alternatively, when an inkjet injecting method is used, the mixed liquid is injected between the partitions 350 to be coated, and when using the polyimide (PI) print method, a resin plate is patterned and then the mixed liquid is only coated between partitions 350 by using the patterned resin plate.

As described above, if the mixed liquid is coated, as shown in FIG. 6, the lyophobic colloid material 95-2 and the supporting layer 95-1 material are simply mixed such that the lyophobic colloid material 95-2 is uniformly mixed throughout the entire lyophobic layer 95.

Next, the lower substrate 110 coated with the mixed liquid is pre-baked at a temperature of between about 100° C. to about 200° C. Pre-baking causes the mixed liquid to separate and form phase-divided layers that include the lyophobic colloid material 95-2 positioned above the supporting layer 95-1 that includes the polymer resin, such as the organic layer or the polyimide (PI) as shown in FIG. 2. The temperature of the pre-bake process may be chosen according to the material included in the mixed liquid, and this pre-bake process is performed at the relatively lower temperature between about 100° C. to about 200° C., whereas the process of baking is performed at a higher temperature. As described above, the lyophobic layer 95 that is phase-separated by the pre-baking provides a water-repellent layer at the upper surface and the organic layer at the lower surface such that two layers may be simply formed through a single coating step followed by pre-baking step.

Next, a characteristic of the lyophobic colloid, a characteristic of the lyophobic layer, and a characteristic of the mixed liquid will be described with reference to FIG. 7 to FIG. 12.

A lyophobic colloid used in an exemplary embodiment of the present inventive concept will be described with reference to FIG. 7.

Figure 7:
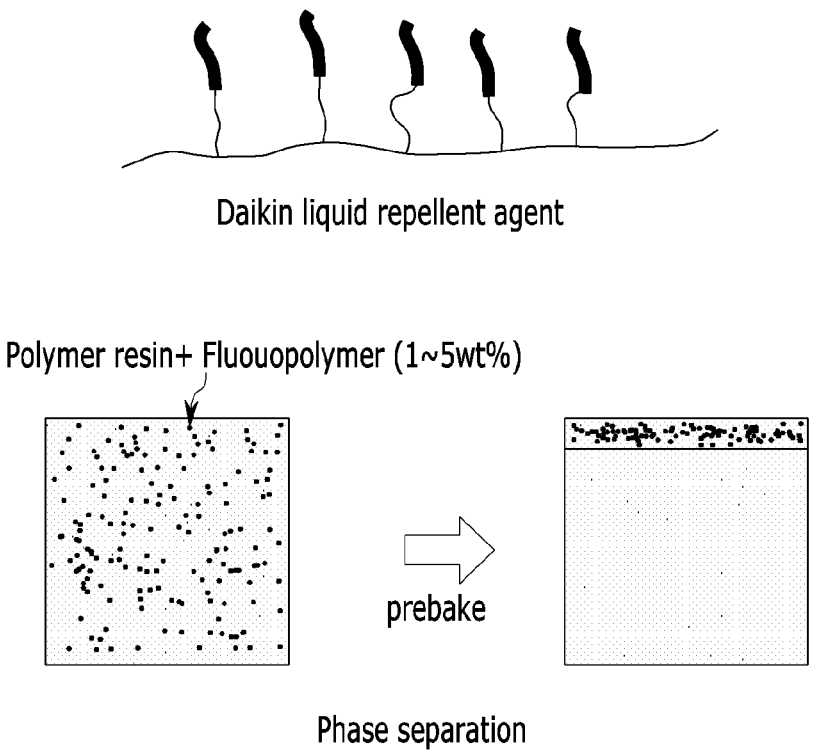
FIG. 7 is a view of a structure and a characteristic of a lyophobic colloid used in an exemplary embodiment of the present inventive concept.

FIG. 7 is a view of a structure and a characteristic of a lyophobic colloid used in an exemplary embodiment of the present inventive concept.

In an upper side of FIG. 7, a simplified structure of a trademarked liquid repellent agent of the Daikin company used as the lyophobic colloid in an exemplary embodiment of the present inventive concept is shown. The Daikin liquid repellent agent includes a main chain, shown in the upper panel of FIG. 7, linked in a horizontal direction, and a plurality of Rf groups (indicated by a thick line), and connected to each other by a spacer and a carbonyl group. The Rf group includes Rf C4α-X. The structure of one embodiment of the Rf C4α-X is shown below.

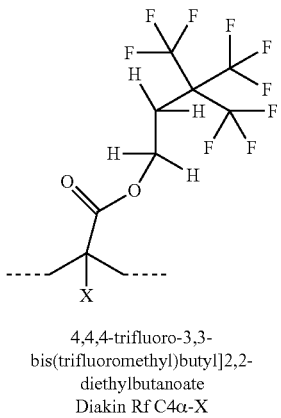

4,4,4-trifluoro-3,3-bis(trifluoromethyl)butyl]2,2-diethylbutanoate
Diakin Rf C4α-X Here, X may be connected with various structures.

In an embodiment of the inventive concept, the liquid repellent agent of Daikin, 20 wt % of the fluoroacrylate copolymer is included in a PGMAE (propylene glycol methylether acetate) solution.

In the lower panels of FIG. 7 show the phase separation of the 1 to 5 wt % of a fluoropolymer (such as the liquid repellent agent of Daikin used in an embodiment of the inventive concept) is added to a polymer resin and is pre-baked such that phase separationoccurs to form seoarate layers.

That is, in the lower panels of FIG. 7, the phase separation of the polymer resin and the liquid repellent agent from the lyophobic colloid is schematically shown.

A phase-separation characteristic will now be described in detail through three exemplary embodiments in FIG. 8 to FIG. 11, with a focus on the formation of the supporting layer 95-1 formed of an organic layer or a polyimide.

FIGS. 8 to 11 include a table and graphs showing the compositions and structures of a lyophobic colloid mixture solution and a pre-baked layer according to exemplary embodiments of the present inventive concept.

Figure 9:
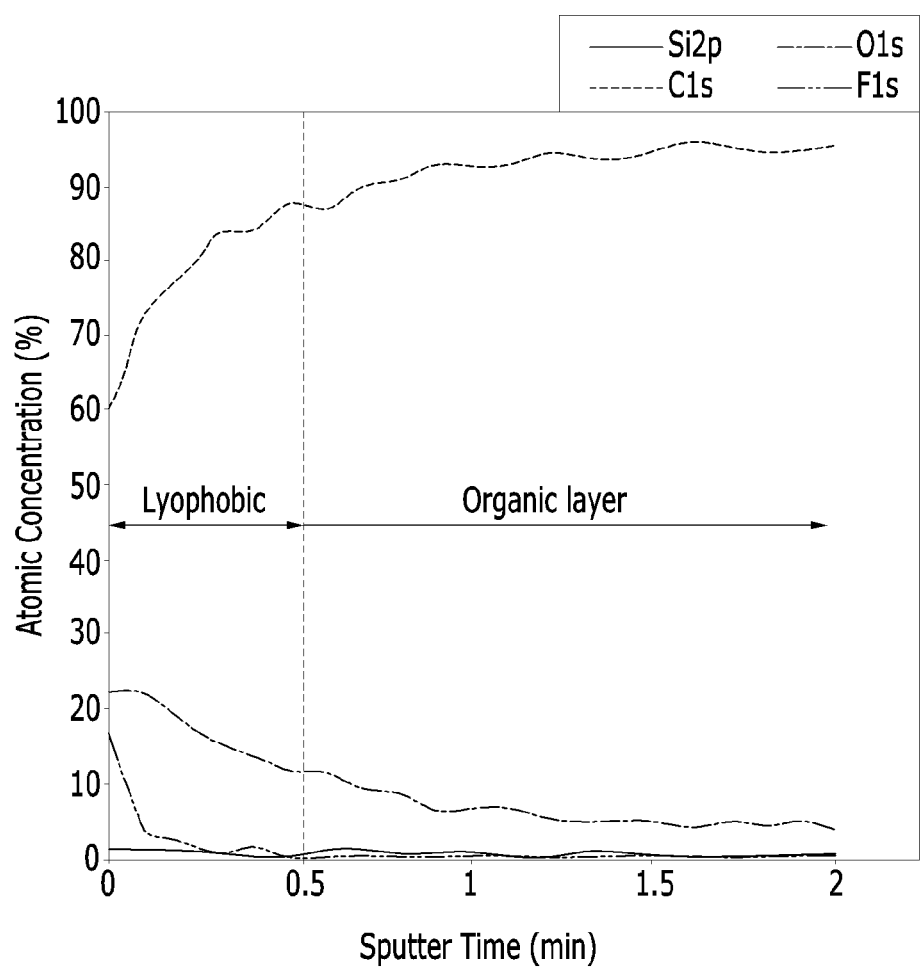
Figure 10:
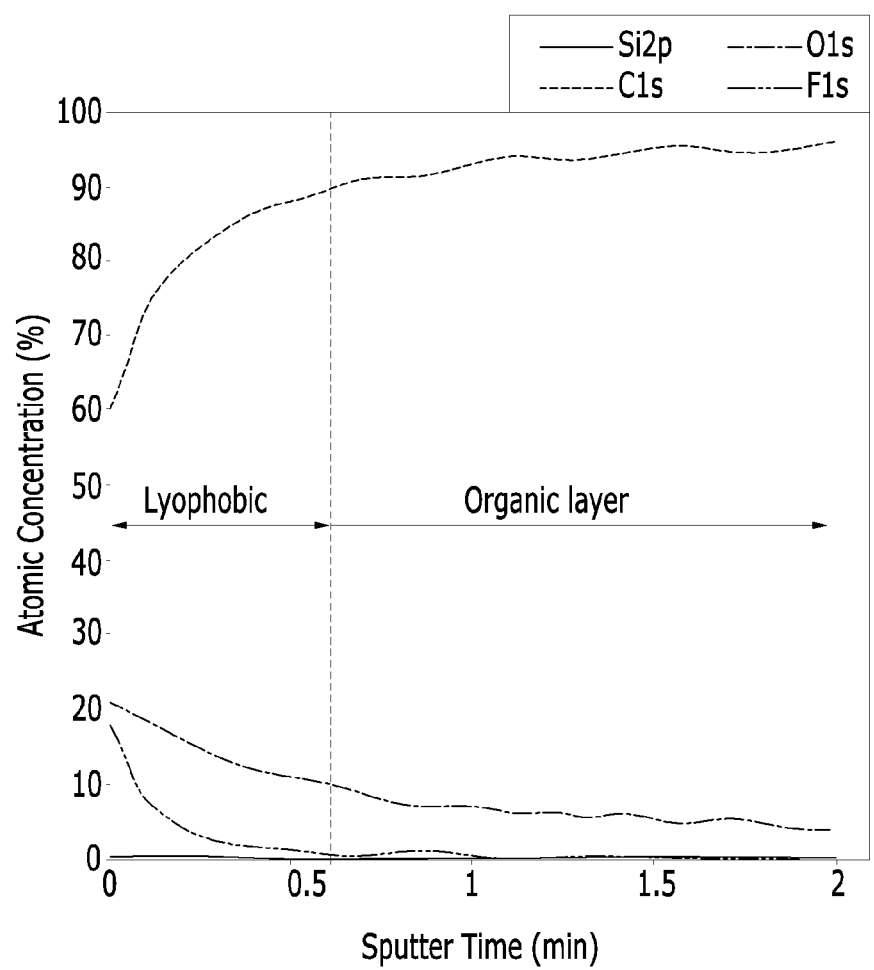
Figure 11:
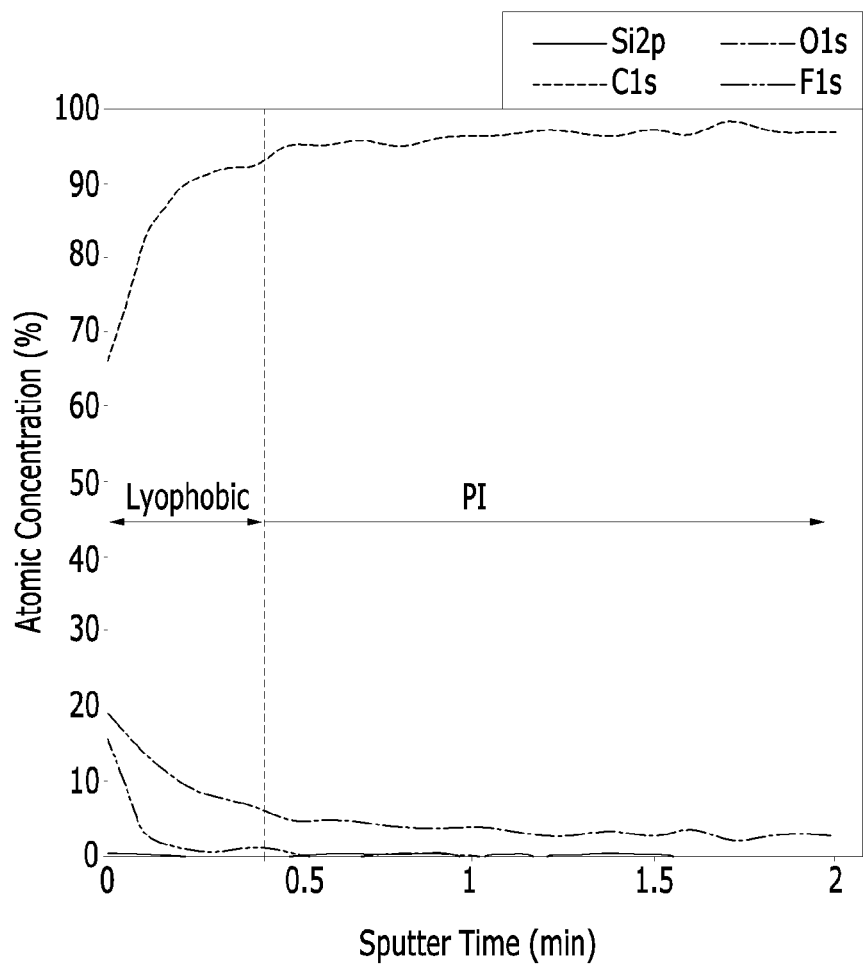

Firstly, three exemplary embodiments will be described with reference to FIG. 8. Measurements of the depth profile for each of the respective exemplary embodiments shown in FIG. 8 are shown in FIGS. 9 to 11.

In the first exemplary embodiment, 6 wt % of a lyophobic colloid is added to an organic layer (SOHN-412R8™) and a liquid repellent agent of Daikin is used as the lyophobic colloid.

In the second exemplary embodiment, 8 wt % of a lyophobic colloid is added to an organic layer (SOHN-412R8™), and a liquid repellent agent of Daikin is used as the lyophobic colloid.

In the third exemplary embodiment, 6 wt % of a lyophobic colloid is added to a polyimide (PI; AL22636) and a liquid repellent agent of Daikin is used as the lyophobic colloid.

Data of measurements of a depth profile for several of the above exemplary embodiments are shown in FIG. 9, FIG. 10 and FIG. 11 respectively.

The depth profile in each of FIG. 9, FIG. 10 and FIG. 11 is a graph showing a detected atom concentration (%) of Si2P, C1S, O1S, and F1S from X-ray photoelectron spectroscopy, after etching with an interval of 0.1 minute by using a supporter of 500 V.

FIG. 9 shows the depth profile of the exemplary embodiment depicted in FIG. 8, No. The exemplary embodiment shows the phase-separation generated by the pre-bake through the depth profile using a fluoride (F) component included in the liquid repellent agent of Daikin.

In FIG. 9, the percentage of F1s is high (>20%) when the sputtering is started and is gradually decreased such that it may be confirmed that the phase-separation occurs. Similarly, it may be confirmed that the organic layer is only positioned where F is not detected. A time that F is not generated may be detected through the sputtering, the depth etched to the corresponding time (about 0.5 minute) is the lyophobic colloid material layer 95-2, and the layer thereunder is the supporting layer 95-1 of the organic layer. When assuming the depth etched by the sputtering with reference to the above time (0.5 minute), according to the phase-separation by the first exemplary embodiment, the supporting layer 95-1 of the organic layer has a thickness of from about 400 nm to about 500 nm, and the lyophobic colloid material 95-2 has a thickness of from about 24 nm to about 30 nm.

The percentage of F1s also initially appears high in FIG. 10 and FIG. 11 as soon as the sputtering is started and is also gradually decreased such that it may be confirmed that the phase-separation occurs. In considering these data, it is assumed that the depth varies in proportion to the etching time.

When pre-baking the mixed liquid of the exemplary embodiment shown in FIG. 8, No. 2, according to the phase-separation, the supporting layer 95-1 of the organic layer has a thickness of from about 400 nm to about 500 nm, and the lyophobic colloid material 95-2 thereon has a thickness of from about 32 nm to about 40 nm.

When pre-baking the mixed liquid of the exemplary embodiment shown in FIG. 8, No. 3, according to the phase-separation, the supporting layer 95-1 of the organic layer has a thickness of from about 1000 Å to about 1500 Å, and the lyophobic colloid material 95-2 thereon has a thickness of from about 60 Å to about 90 Å.

FIGS. 9 to 11, confirm that the phase-separation occurs when the polymer resin of the organic layer or the polyimide (PI) and the lyophobic colloid material are mixed and pre-baked.

Next, affinity of the lyophobic colloid mixed liquid for DI water (deionized water) will be described to confirm operation of an embodiment of the black oil layer 310 of the electrowetting display device without errors. A large contact angle of the black oil layer 310 for DI water is considered a good characteristic for an electrowetting display device according to the present inventive concept.

Figure 12:
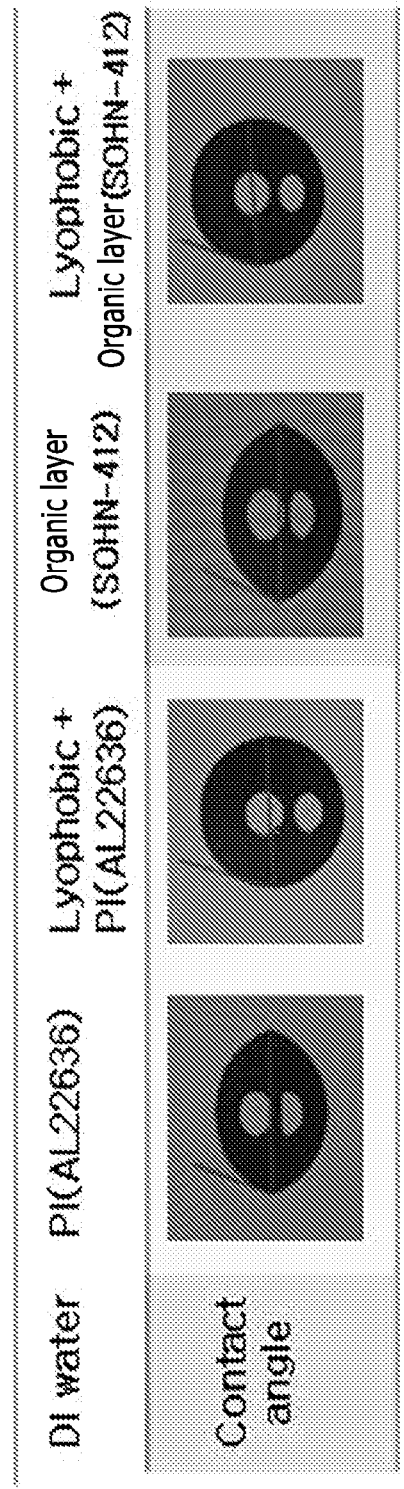
FIG. 12 is a photograph picturing a contact angle of an exemplary embodiment of the present inventive concept and a comparative example.

FIG. 12 is a photograph showing a contact angle of an exemplary embodiment of the present inventive concept and a comparative example.

FIG. 12 is a photograph showing the contact angle of a lyophobic colloid mixed liquid after the lyophobic colloid mixed liquid is positioned on DI water. The pictures of FIG. 12 are symmetrical about a vertical axis, due to the DI water being positioned under the lyophobic colloid mixed liquid, or reflected by a mirror thereunder, pictured together.

In FIG. 12, the four materials pictured from left to right are: a polyimide (PI; AL22636): a mixed liquid of a lyophobic colloid material and a polyimide; an organic layer (SOHN-412); and a mixed liquid of a lyophobic colloid material and an organic layer.

The mixed liquid including the lyophobic colloid material has a large contact angle compared with the case of including the polyimide only; and the mixed liquid including the lyophobic colloid material has a large contact angle compared with the case of including only the organic layer.

As a result, the lyophobic colloid mixed liquid has a large contact angle for the DI water, and as a result, in the electrowetting display device, the operation characteristic of the black oil layer 310 is thus shown to be good even though the lyophobic colloid mixed liquid is formed under the black oil layer 310.

An electrowetting display device according to an exemplary embodiment of the present inventive concept will now be described with reference to FIG. 13.

Figure 13:
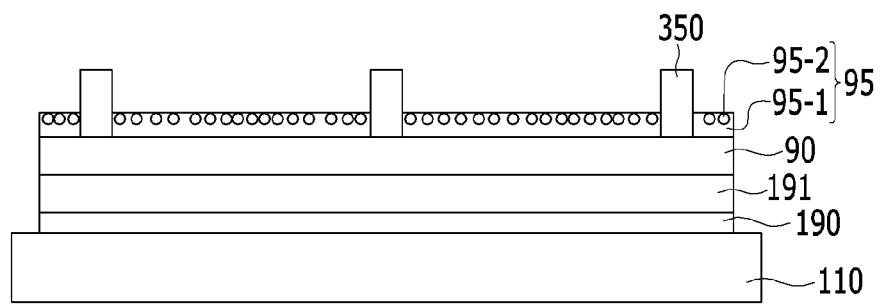
FIG. 13 is an enlarged cross-sectional view of an electrowetting display device according to an exemplary embodiment of the present inventive concept.

FIG. 13 is an enlarged cross-sectional view of an electrowetting display device according to an exemplary embodiment of the present inventive concept.

FIG. 13 is a structure in which a reflecting electrode 191 formed of a material that reflects light is formed between the pixel electrode 190 and the interlayer insulating layer 90, as distinct from the structure shown in FIG. 2. As explained above, electrowetting display devices may be of the transmissive display device type or of the reflective display device type. In the case of a transmissive display device (referring to FIG. 1 and FIG. 2), the light provided from a backlight (not shown) is transmitted to display the luminance. In the case of a reflective display device (referring to FIG. 13), external light is reflected by the reflecting electrode and is again emitted to the outside to display the luminance or to use as a front light (not shown).

In a conventional electrowetting display device, the layer having the hydrophobicity is formed at a position of the interlayer insulating layer 90 of the present inventive concept, and in this case, the layer is hydrophobic and may be treated by reactive ion etching (RIE) to have sufficient hydrophilicity to form the partitions 350 thereon. However, according to the electrowetting display device and the manufacturing method thereof according to an exemplary embodiment of the present inventive concept, the partitions 350 are easily formed by forming the interlayer insulating layer 90, and the lyophobic layer 95 may be formed on the interlayer insulating layer 90 through the single pre-baking step after depositing the mixed liquid, thereby remarkably reducing the number of steps in the manufacturing process. Particularly, the lyophobic layer 95 that is phase-separated by the pre-baking has the characteristic of the water-repellent layer at the upperlayer, and the lower layer has the characteristic of anorganic layer that two layers may be readily formed by a single coating step followed by a pre-baking step.

In one embodiment of the above method, the liquid repellent agent of Daikin may be used as the lyophobic colloid material. However, a colloid material that is not miscible with a liquid (including the water) may be used as an alternative to the liquid repellent agent of Daikin, and when using a colloid including an Rf group or Rf C4α-X or another lyophobic colloid, the same characteristics may be obtained.

Next, various examples of the lyophobic colloid according to an exemplary embodiment of the present inventive concept will be described.

FIG. 14 and FIG. 15 show examples and characteristics of lyophobic colloids according to an exemplary embodiment of the present inventive concept.

FIG. 14 shows various lyophobic colloids and components thereof according to an exemplary embodiment of the present inventive concept. The name of each lyophobic colloid is given in the leftmost column, components thereof are described at the right side, and an "O" means that a polymer or a monomer of a corresponding column is included.

In FIG. 15, the molecular weight of each lyophobic colloid provided in FIG. 14 and the contact angle for each material (water, n-HD (n-hexadecane) and BCA (butyl carbitol acetate, also known as diethylene glycol monobutylether acetate) are disclosed.

Next, an electrowetting display device according to an exemplary embodiment of the present inventive concept will be described with reference to FIG. 16 et seq.

Firstly, a display device according to an exemplary embodiment of the present inventive concept will be described with reference to a cross-sectional view of an electrowetting display device shown in FIG. 16.

Figure 16:
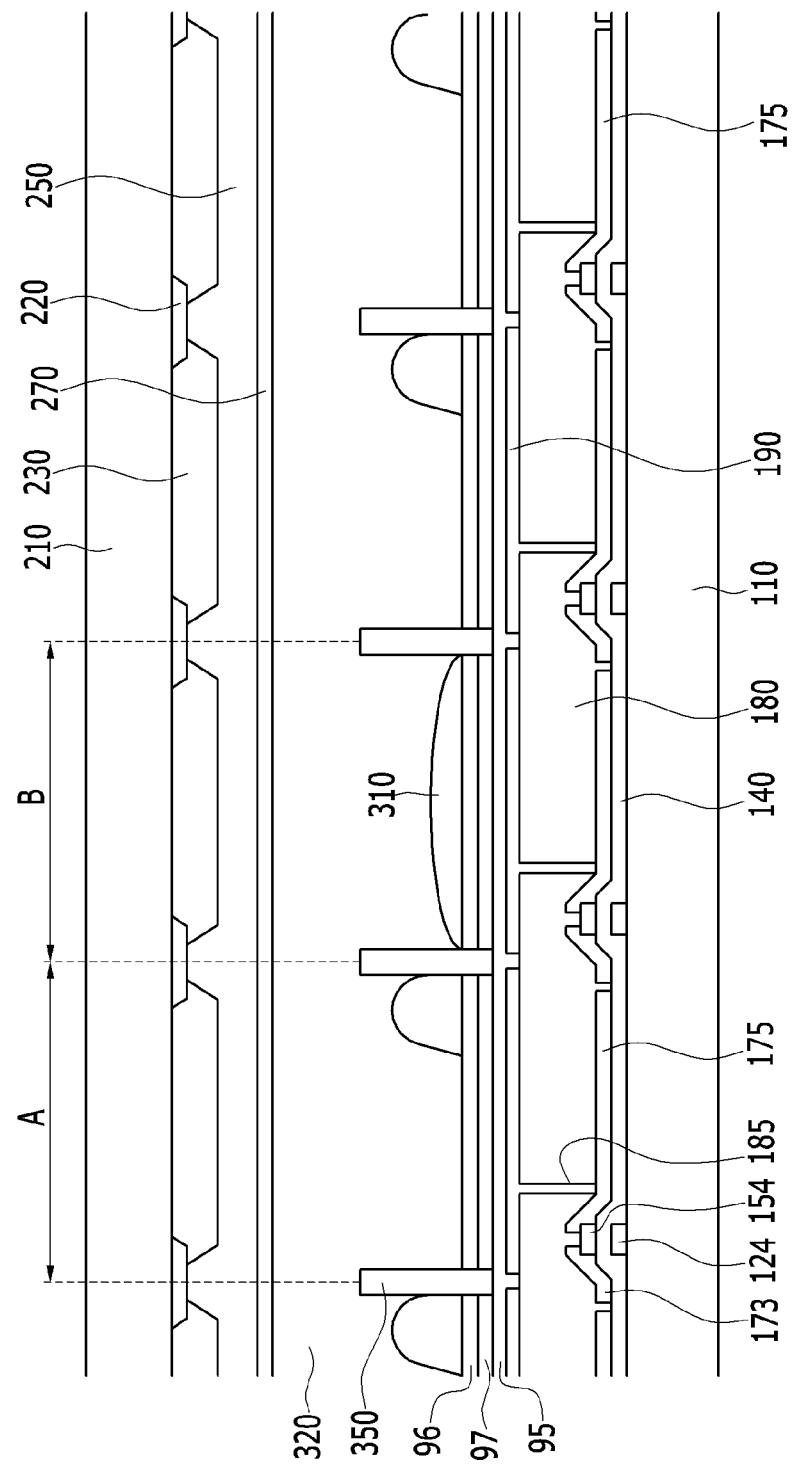
FIG. 16 is a cross-sectional view of an electrowetting display device according to an exemplary embodiment of the present inventive concept.

FIG. 16 shows an electrowetting display device according to an exemplary embodiment of the present inventive concept is a transmissive electrowetting display device that includes a lower substrate 110 formed with a pixel electrode 190, an upper substrate 210 facing the lower substrate 110 and formed with a common electrode 270, and electro-optic layers 310 and 320 positioned between the lower substrate 110 and the upper substrate 210. The lower substrate 110 includes partitions 350 forming a plurality of openings (spaces between partitions), and the electro-optic layers 310 and 320 include a black oil layer 310 disposed inside the opening between the partitions 350 and an aqueous solution layer 320 positioned between the black oil layer 310 and the common electrode 270.

The lower substrate 110 and the upper substrate 210 may be flexible substrates formed of glass, plastic, or a glass fiber reinforced plastic (FRP).

Gate electrodes 124 connected to a plurality of gate lines extending in one direction are formed on the lower substrate 110. A gate insulating layer 140 formed of silicon nitride (SiNx) is formed on the gate lines and the gate electrodes 124.

A semiconductor layer 154 formed of hydrogenated amorphous silicon is disposed on the gate insulating layer 140. The semiconductor layer 154 forms a channel of the thin film transistor. A data line and a drain electrode 175 are disposed on the gate insulating layer 140 and the semiconductor layer 154. The data line extends in a direction perpendicular to the gate line, intersecting the gate line, and a branch extended from the data line forms a source electrode 173. At least portions of a pair of a source electrode 173 and drain electrode 175 are positioned on the semiconductor layer 154, and are separated from each other and are disposed on opposite sides of the gate electrode 124.

An ohmic contact (not shown) is positioned between the semiconductor layer 154, and the source electrode 173 and the drain electrode 175, thereby reducing contact resistance therebetween.

A passivation layer 180 formed from an insulating material such as silicon oxide or silicon nitride or an organic material, is formed on the source electrode 173, the drain electrode 175, the semiconductor layer 154, and the gate insulating layer 140.

A pixel electrode 190 formed of a transparent conductive material such as ITO (indium tin oxide) or IZO (indium zinc oxide) is disposed on the passivation layer 180.

The passivation layer 180 has a contact hole 185 exposing the drain electrode 175. The pixel electrode 190 is physically and electrically connected to the drain electrode 175 through the contact hole 185.

An interlayer insulating layer 95 is formed on the pixel electrode 190, and the interlayer insulating layer 95 is formed of an inorganic insulating layer such as silicon nitride (SiNx) or an organic insulator. The interlayer insulating layer 95 may have a leveling function of removing a step generated between the neighboring pixel electrodes 190.

In this embodiment, the partitions 350 are formed on the interlayer insulating layer 95. The partitions 350 are disposed in a matrix formation having walls and openings defining a pixel area, and may be formed of an organic layer that may include a black dye.

A photoreactive fluorine-based surfactant layer 97 (UV/light reactive fluorosurfactant) having lyophobicity and that is phase-separated by positioning a fluorine-based material thereon is formed on the interlayer insulating layer 95 between the openings of the partitions 350. The photoreactive fluorine-based surfactant layer 97 includes a photoreactive material that reacts with ultraviolet light and a fluorine-based material. This layer is positioned such that the phase-separation is generated by the action of ultraviolet light on the photoreactive material of the surfactant layer.

Suitable fluorine-based materials included in the photoreactive fluorine-based surfactant layer 97', including various materials, such as for example "Megaface™ RS-72-K (manufactured by DIC Co. Ltd)".

Another example of the photoreactive fluorine-based surfactant 97' is a material that includes a compound having a perfluoro alkyl group and a photoreactive material. In addition, a material having a photoreactive group and a compound having a perfluoro alkyl group are further examples.

In this example, the perfluoro alkyl group is a material of which all or a portion of hydrogen atoms in a hydrocarbon are substituted with fluorine atoms.

The photoreactive fluorine-based surfactant layer 97 will be further described later in FIG. 22 and FIG. 23.

A water-repellent layer 96 is formed in the opening and on the photoreactive fluorine-based surfactant layer 97. The water-repellent layer 96 is formed of a hydrophobic insulating material (for example, AF1600 from DuPont Co. Ltd).

A black oil layer 310 is formed on the water-repellent layer 96.

Meanwhile, a black matrix 220 having openings is formed under the upper substrate 210, and a color filter 230 is formed in the openings of the black matrix 220. The color filter 230 may include a pigment that transmits only a predetermined wavelength or that may be formed of a quantum dot (semiconductor nanocrystal) material. The quantum dot material is a semiconductor material having a crystalline structure with a size of several nanometers and includes several hundred to several thousand atoms, and since the size thereof is so very small, the surface area per unit volume is very large, resulting in a quantum confinement effect. Accordingly, the quantum dot material has unique physical and chemical characteristics that are different from the corresponding original characteristics of the semiconductor material from which it I s formed.

For color display, each pixel PX uniquely represents one of primary colors (i.e., spatial division) or alternatively, each pixel PX sequentially represents one of the primary colors in turn (i.e., temporal division), such that a spatial or temporal sum of the primary colors is recognized as a desired color. An example of a set of primary colors includes the colors red, green, and blue.

A planarizing layer 250 is formed under the color filter 230 and the black matrix 220, and a common electrode 270 is formed under the planarizing layer 250.

An aqueous solution layer 320 is formed between the partition 350 and the black oil layer 310, and the common electrode 270. The aqueous solution layer 320 doesnot mix with the black oil layer 310.

Surface tension of the aqueous solution layer 320 is not changed in the pixel B in which an electric field is not formed between the pixel electrode 190 and the common electrode 270 such that the black oil layer 310 covers the entire pixel B. Accordingly, the light incident from a lower side is not transmitted to the upper side, and black (corresponding to no color) is displayed.

In the pixel A, the surface tension of the aqueous solution layer 320 is changed by an electric field is formed between the pixel electrode 190 and the common electrode 270 causing the black oil layer 310 to be repelled by the applied electric field and accumulates at one side of the pixel, thereby opening the corresponding pixel A to permit light transmission. Accordingly, the light incident from the lower side is transmitted to the upper side and the pixel A displays a color according to the color of the filter 230.

According to an exemplary embodiment, the color filter 230 may be omitted, and when the flat panel display according to the present inventive concept does not include the color filter 230, the pixel A transmits all wavelengths of light and displays white such that the flat panel display may be used as a black and white display device.

Figure 17:
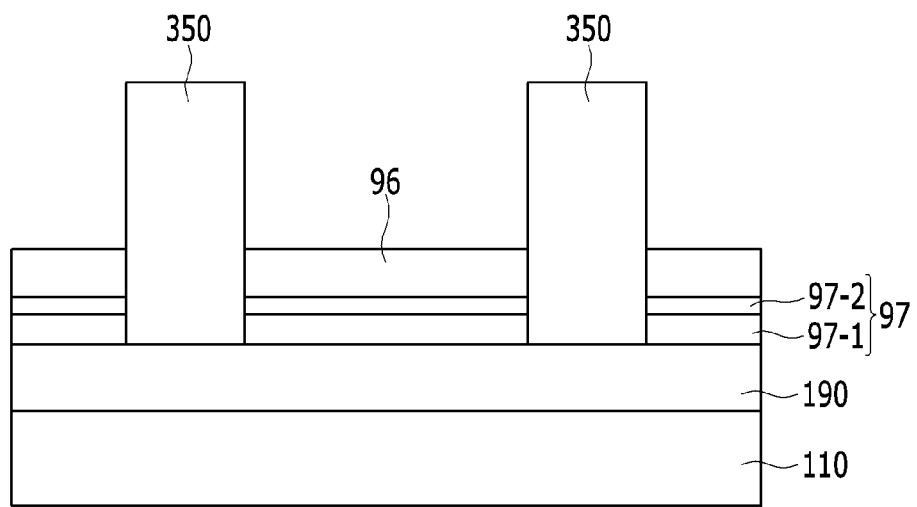
FIG. 17 is an enlarged cross-sectional view of an electrowetting display device according to an exemplary embodiment of the present inventive concept.

To describe the photoreactive fluorine-based surfactant layer 971 in detail, FIG. 17 shows an enlarged cross-sectional view of an electrowetting display device according to an exemplary embodiment of the present inventive concept.

FIG. 17 is an enlarged cross-sectional view of an electrowetting display device according to this exemplary embodiment of the present inventive concept, and only the lower substrate 110 is illustrated.

In FIG. 17, the thin film transistor (the gate electrode, the source electrode, the drain electrode, and the conductor layer) formed on the lower substrate 110 is omitted, and only a structure of the pixel electrode 190 is shown. Also, the exemplary embodiment of FIG. 17 is a structure in which the interlayer insulating layer 95 is not formed on the pixel electrode 190. The interlayer insulating layer 95 may or may not be included according to the particular exemplary embodiment.

A pixel electrode 190 is formed on the lower substrate 110. In FIG. 17, the pixel electrode 190 is shown to be integrally formed, however in practice the pixel electrode 190 is electrically separated for each pixel and FIG. 17 shows a schematic layer where the pixel electrode 190 is formed and the boundaries for each pixel electrode are not shown.

A partition 350 is formed on the pixel electrode 190. The pixel electrode 190 is hydrophilic, i.e. does not have lyophobicity (or hydrophobicity) such that there is no problem when forming the partition 350 on the pixel electrode 190. Alternatively, in an exemplary embodiment in which the interlayer insulating layer 95 is formed on the pixel electrode 190, the interlayer insulating layer 95 is hydrophiclic, i.e. does not have lyophobicity (or hydrophobicity) such that there is no problem when forming the partition 350 on the interlayer insulating layer 90.

A photoreactive fluorine-based surfactant layer 97 is formed in the opening of the partition 350 and on the pixel electrode 190 (or in the exemplary embodiment of FIG. 16, the interlayer insulating layer 95). The photoreactive fluorine-based surfactant layer 97 is phase-separated as shown in FIG. 17. That is, in the photoreactive fluorine-based surfactant layer 97, the lyophobic fluorine-based material 97-2 is formed above and a light reactive material 97-1 that is hardened by the reaction to the ultraviolet (UV) rays or light is positioned below.

Next, a manufacturing method of an electrowetting display device according to an exemplary embodiment of the present inventive concept will be sequentially described with reference to FIG. 18 to FIG. 21 and with reference to FIG. 17.

FIG. 18 to FIG. 21 are cross-sectional views showing each manufacturing step of an electrowetting display device according to an exemplary embodiment of the present inventive concept.

FIG. 18 to FIG. 21 sequentially show how each layer is formed on the lower substrate 110 of the electrowetting display device according to the exemplary embodiment of FIG. 17.

Figure 18:
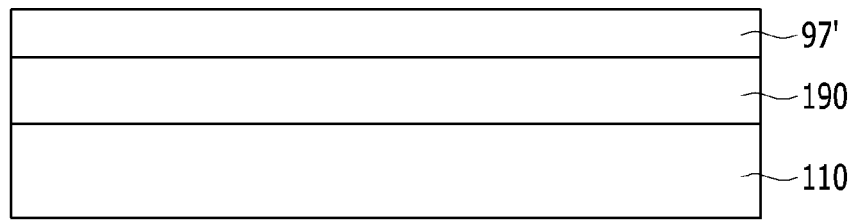
FIG. 18 to FIG. 21 are cross-sectional views showing each manufacturing step of an electrowetting display device according to an exemplary embodiment of the present inventive concept.

Firstly, a pixel electrode 190 is formed on the lower substrate 110 in FIG. 18. In FIG. 18, the pixel electrode 190 is integrally shown to schematically show the formation position of the pixel electrode 190 as in FIG. 17, but in actuality, the pixel electrode 190 is formed for each pixel and is separated for each pixel. Next, according to an exemplary embodiment, an interlayer insulating layer 95 is formed on the pixel electrode 190. The interlayer insulating layer 90 may be formed of aminorganic insulating layer such as silicon nitride (SiNx) or an organic insulator, and may have the function of leveling any step that may have been formed between the neighboring pixel electrodes 190.

Next, a photoreactive fluorine-based surfactant 97' is deposited on the pixel electrode 190 (in the exemplary embodiment of FIG. 16, the interlayer insulating layer 95). The photoreactive fluorine-based surfactant 97' may be any one of various kinds, of photoreactive fluorine-based surfactant for instance the photoreactive fluorine-based surfactant 97' according to the exemplary embodiment shown later in FIG. 22 includes the fluorine-based material 97-2 (fluoro-group), a photoreactive material 97-1' (UV reactive group), and a photoinitiator 97-3.

Figure 19:
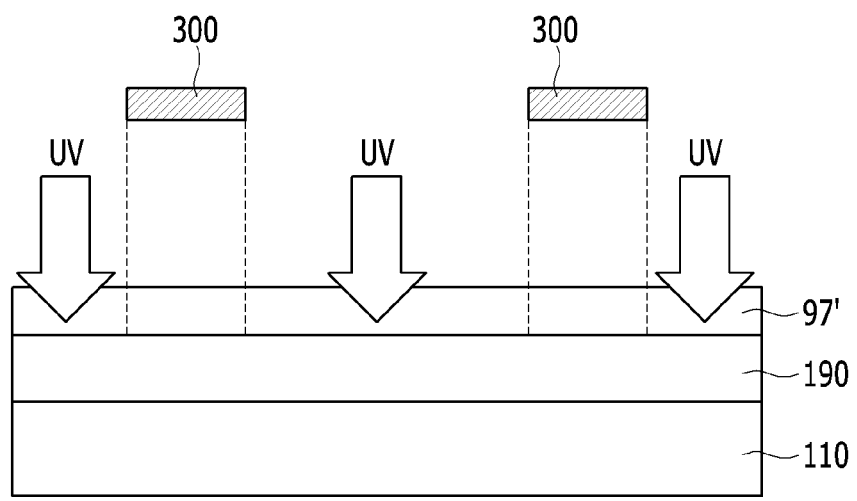
Figure 20:
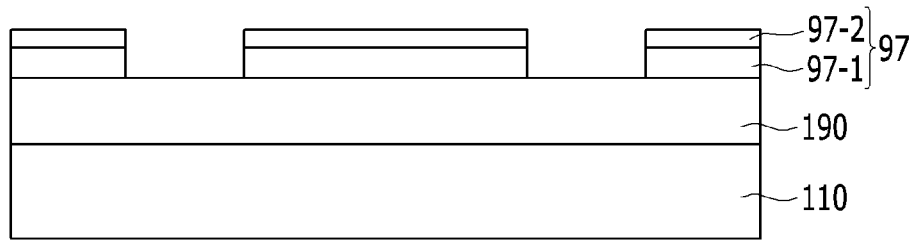

Next, as shown in FIG. 19, a region exposed by a mask 300 is exposed to ultraviolet (UV) light. In the photoreactive fluorine-based surfactant 97' exposed to the ultraviolet (UV) light, the photoreactive material 97-1' reacts and is cured and hardened such that the photoreactive material layer 97-1 is formed below and the fluorine-based material 97-2 is formed above in the layer 97. Alternatively, in the photoreactive fluorine-based surfactant 97' that is not exposed, the photoreactive material 97-1' is not hardened and it is removed by a developer to form the photoreactive fluorine-based surfactant 97. This photoreactive fluorine-based surfactant layer 97 is shown in FIG. 20.

Figure 21:
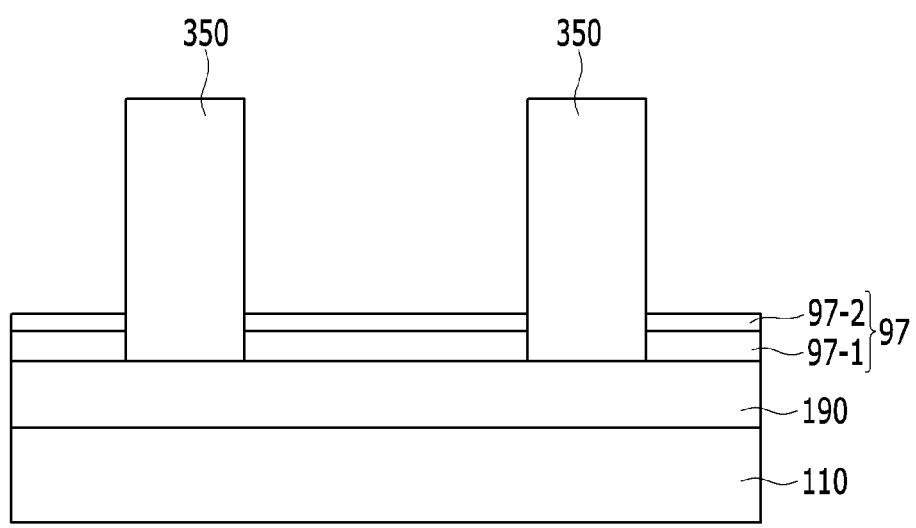

Next, as shown in FIG. 21, a partition 350 is formed in the region where the photoreactive fluorine-based surfactant 97' was not exposed and has been removed. The partition 350 is formed on the pixel electrode 190 (or as in the exemplary embodiment of FIG. 16, on the interlayer insulating layer 95). The partitions 350 are formed into the black matrix having openings and the openings define the pixel area such that the black oil layer 310 only moves inside the pixel area. Alternatively, the partitions 350 may be formed on the organic layer including the black pigment.

Next, referring back to FIG. 17, a water-repellent layer 96 is formed between the openings of the partition 350 on the photoreactive fluorine-based surfactant layer 97. A black oil layer 310 (not shown) is then formed on the water-repellent layer 96 having hydrophobicity.

As described above, the photoreactive fluorine-based surfactant is phase-separated by the exposure and is easily patterned by using the developer to form the photoreactive fluorine-based surfactant layer such that an adhesive force may be sufficient to adhere through the water-repellent hydrophobic upper layer, and the hydrophilicity is provided at the lower and lateral side to easily adhere to the partition.

In an alternative embodiment of the inventive concept, the pixel electrode 190 may be formed of a metal for reflecting light, or a metal layer (referred to as a reflecting electrode) reflecting light may be further formed on the pixel electrode 190 to form a reflective electrowetting display device.

Figure 22:
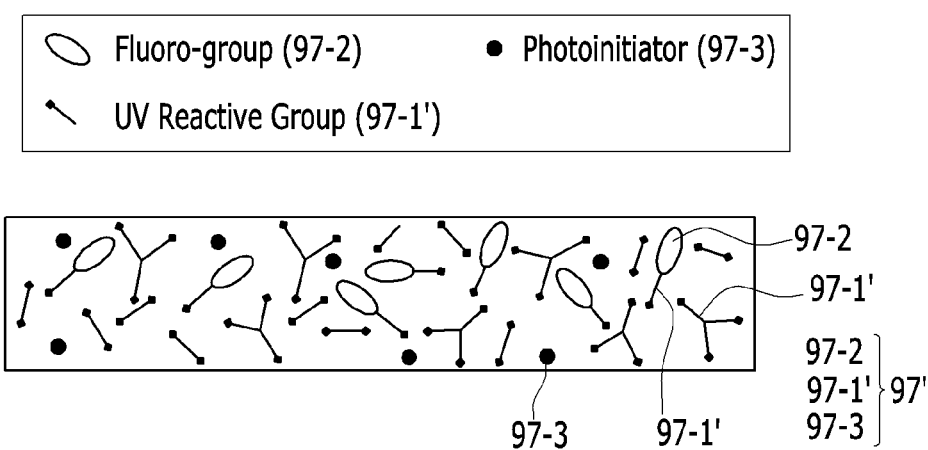
FIG. 22 is a view of a structure of a photoreactive fluorine-based surfactant used in an exemplary embodiment of the present inventive concept.

The reactive material 97-1' and a photoinitiator 97-3 in the exemplary embodiment of FIG. 22 are reactive with ultraviolet (UV) rays. As shown in FIG. 22, there may be multiple photoreactive materials 97-1', or only one photoreactive material 97-1'. The one or more reactive groups 97-1' may be included separately as monomers or multimers, or linked to the fluorine-based material 97-2.

Examples of suitable photoreactive fluorine-based surfactant 97', there are various materials, and as one example, there is "Megaface RS-72-K (manufactured by DIC Co. Ltd). Here, Megaface is a brand name, and RS-72-K is a type number.

Further examples of the photoreactive fluorine-based surfactant 97' include a material including a compound having a perfluoro alkyl group and a photoreactive material, and a material having a group that is photoreactive to a compound having a perfluoro alkyl group may also be included.

Here, the perfluoro alkyl group may be a material of which all or a portion of hydrogen atoms in a hydrocarbon is substituted with fluorine atoms.

Figure 23:
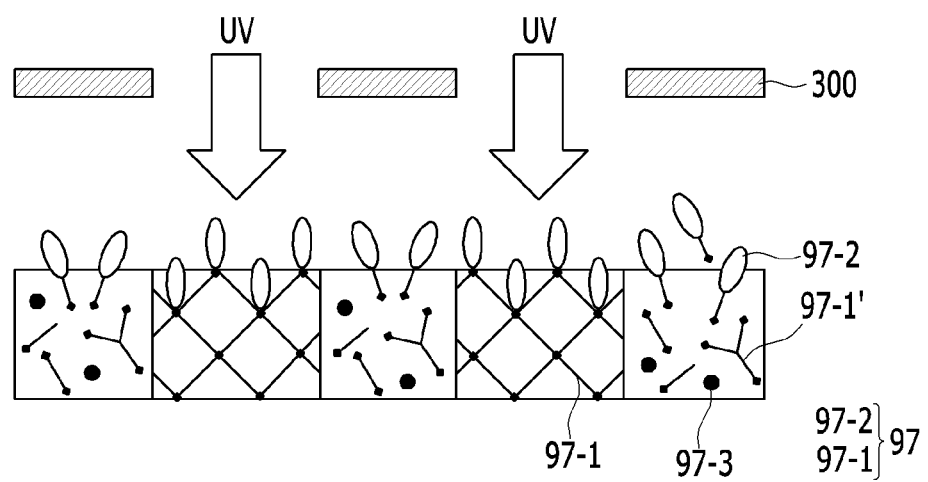
FIG. 23 is a view of a characteristic of a photoreactive fluorine-based surfactant changed by exposure in an exemplary embodiment of the present inventive concept.

The products of photoreaction by UV light are shown in FIG. 23 in detail. That is, if the photoreactive fluorine-based surfactant 97' is coated, the fluorine-based material 97-2, the photoreactive material 97-1', and the photoinitiator 97-3 are randomly arranged. However, the fluorine-based material 97-2 may be formed at the surface of the photoreactive fluorine-based surfactant 97' based on its intrinsic hydrophobic characteristic. In this state the separated layers are not hardened and may be removed by the developer.

If this photoreactive fluorine-based surfactant 97' is exposed to ultraviolet (UV) light, the photoreactive material 97-1' and the photoinitiator 97-3 are reacted such that the hardened photoreactive material 97-1 is formed and disposed below, and the fluorine-based material 97-2 is disposed above within the layer 97. The fluorine-based material 97-2 is connected to the photoreactive material 97-1' and is then disposed above and hardened when the photoreactive material 97-1' is reacted and hardened. As a result, the photoreactive fluorine-based surfactant layer 97 is phase-separated into the fluorine-based material 97-2 positioned in the upper portion of the layer and the hardened photoreactive material 97-1 is positioned below the hardened fluorine-based material 97-2.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. An electrowetting display device comprising:
   a substrate;
   a pixel electrode formed on the substrate;
   an interlayer insulating layer formed on the pixel electrode;
   a plurality of partitions formed on the interlayer insulating layer; and
   a lyophobic layer formed on the interlayer insulating layer between the partitions, wherein the lyophobic layer is phase-separated such that the lyophobic layer comprises (i) lyophobic colloid material and (ii) a polymer resin.

2. The electrowetting display device of claim 1, wherein the polymer resin comprises one of (i) an organic layer or (ii) a polyimide,
   the lyophobic colloid material is positioned above the polymer resin.

3. The electrowetting display device of claim 2, wherein the lyophobic colloid material includes an Rf group.

4. The electrowetting display device of claim 3, wherein the Rf group includes Rf C4α-X.

5. The electrowetting display device of claim 3, wherein the lyophobic colloid material includes a liquid repellent agent of Daikin.

6. The electrowetting display device of claim 1, wherein a black oil layer is disposed on the lyophobic layer between the partitions.

7. The electrowetting display device of claim 1, wherein a reflecting electrode formed of a material that reflects light is disposed between the pixel electrode and the interlayer insulating layer.

8. A method for manufacturing an electrowetting display device, comprising:
   forming a pixel electrode on a substrate;
   forming an interlayer insulating layer on the pixel electrode;
   forming a partition on the interlayer insulating layer;
   coating a lyophobic colloid mixed liquid on the interlayer insulating layer between the partitions; and
   pre-baking the lyophobic colloid mixed liquid;
   wherein the lyophobic colloid mixed liquid comprises a mixture including a lyophobic colloid material and a supporting layer material, wherein the supporting material comprises a polymer resin of an organic layer or a polyimide (PI).

9. The method of claim 8, wherein
   the lyophobic colloid mixed liquid is phase-separated by the pre-baking the lyophobic colloid mixed liquid and forms a lyophobic layer, and
   the lyophobic layer includes a lyophobic colloid material and a supporting layer.

10. The method of claim 9, wherein
    the lyophobic colloid material is positioned above the supporting layer on the interlayer insulating layer between the partitions.

11. The method of claim 10, wherein
    the lyophobic colloid material includes an Rf group.

12. The method of claim 11, wherein
    the Rf group includes Rf C4α-X.

13. The method of claim 11, wherein
    the lyophobic colloid material includes a liquid repellent agent of Daikin.

14. The method of claim 9, wherein
    the supporting layer includes an organic layer of a polyimide resin.

15. The method of claim 8, wherein
    the lyophobic colloid mixed liquid is coated through a spin coating method, a spray coating method, an inkjet injecting method, or a polyimide (PI) print method.

16. The method of claim 8, further comprising,
    after the pre-baking, forming a black oil layer on the lyophobicity layer between the partitions.

17. The method of claim 8, further comprising,
    forming a reflecting electrode formed of a material that reflects light between the pixel electrode and the interlayer insulating layer.

18. The method of claim 8, wherein
    the lyophobic colloid mixed liquid includes a photoreactive fluorine-based material.

19. An electrowetting display device comprising:
    a substrate;
    a pixel electrode formed on the substrate;
    a plurality of partitions formed on the pixel electrode;
    a phase-separated photoreactive fluorine-based surfactant layer formed on an interlayer insulating layer between the partitions; and
    a water-repellent layer formed on the photoreactive fluorine-based surfactant layer,
    wherein the phase-separated photoreactive fluorine-based surfactant layer is phase-separated such that the photoreactive fluorine-based surfactant comprises (i) a fluorine-based material and (ii) a photoreactive material, and
    wherein the fluorine-based material is above the photoreactive material.

20. The electrowetting display device of claim 19, wherein the photoreactive fluorine-based surfactant comprises "Megaface RS-72-K" manufactured by DIC company.

21. The electrowetting display device of claim 19, wherein the photoreactive fluorine-based surfactant includes a compound having a perfluoro alkyl group and a photoreactive material.

22. The electrowetting display device of claim 19, wherein a black oil layer is formed on the water-repellent layer between the partitions.

23. The electrowetting display device of claim 19, wherein the interlayer insulating layer is disposed on the pixel electrode and (i) under the photoreactive fluorine-based surfactant layer and (ii) under the partition.

24. A method for manufacturing an electrowetting display device, comprising:
    forming a pixel electrode on a substrate;
    coating a photoreactive fluorine-based surfactant on the pixel electrode, wherein the photoreactive fluorine-based surfactant includes (i) a photoreactive material and (ii) a fluorine-based material;
    depositing a mask on first portions of the coated photoreactive fluorine-based surfactant;
    exposing second portions of the coated photoreactive fluorine-based surfactant, wherein upon exposure of the second portions of the coated photoreactive fluorine-based surfactant, the second portions of the coated photoreactive fluorine-based surfactant are hardened and phase-separated to form a phase-separated photoreactive fluorine-based surfactant layer, and wherein the phase-separated photoreactive fluorine-based surfactant layer comprises a fluorine-based material positioned above a photoreactive material;

removing the first portions of the photoreactive fluorine-based surfactant layer;

forming a plurality of partitions at the first portions of the coated photoreactive fluorine-based surfactant layer where the first portions of the coated photoreactive fluorine-based surfactant layer are removed; and forming a water-repellent layer on the photoreactive fluorine-based surfactant layer between the partitions.

25. The method of claim 24, wherein
the photoreactive fluorine-based surfactant is "Megaface RS-72-K" manufactured by DIC company.

26. The method of claim 24, wherein
the photoreactive fluorine-based surfactant includes a compound having a perfluoro alkyl group and a photoreactive material.

27. The method of claim 24, wherein
a developer is provided to remove the first portions of the coated photoreactive fluorine-based surfactant.

28. The method of claim 24, further comprising,
after forming the water-repellent layer, forming a black oil layer on the water-repellent layer between the partitions.

29. The method of claim 24, further comprising
forming an interlayer insulating layer on the pixel electrode after the forming of the pixel electrode and before the coating of the photoreactive fluorine-based surfactant.

* * * * *